United States Patent Office 3,524,861
Patented Aug. 18, 1970

3,524,861
PHOSPHORYLATED BENZOFURAZANS
Johannes T. Hackmann, Enschede, Netherlands, and Derek A. Wood, Sittingbourne, Kent, England, assignors to Shell Oil Company, New York, N.Y., a corporation of Delaware
No Drawing. Continuation-in-part of application Ser. No. 487,062, Sept. 13, 1965. This application Feb. 2, 1967, Ser. No. 613,422
Claims priority, application Great Britain, Sept. 14, 1964, 37,449/64; June 24, 1965, 26,792/65
Int. Cl. C07f 9/12, 9/18
U.S. Cl. 260—307      4 Claims

ABSTRACT OF THE DISCLOSURE

The following specification is drawn to novel dialkyl benzofurazanyl phosphates and phosphorothionates, and their use as insecticides.

CROSS-REFERENCE

This application is a continuation-in-part of our copending application Ser. No. 487,062, filed Sept. 13, 1965, now abandoned.

This invention relates to novel benzofurazan esters of dialkyl acid phosphates and phosphorothionates, useful as insecticides. The invention further relates to pesticidal compositions containing the novel compounds and to their use in combatting insect pests.

The control of insect pests has become an integral part of agricultural practices. With the increased use of insecticides, a need has arisen for new chemicals to combat insect pests which have developed a tolerance to existing insecticides. It is therefore vital to have available new and effective chemicals which will replace existing materials once insects have developed resistance.

There is a need to develop effective insecticides for public health purposes as well as for agricultural purposes. An insecticide with utility in both these major areas is a goal of the chemical industry.

It is an object of this invention to provide novel compounds for the control of a wide spectrum of insect pests. It is also an object of the invention to provide insecticidal formulations which will effectively control insects and yet at effective dosages will not adversely affect vegetation. It is yet another object of the invention to provide an effective method of insect control.

These and other objects are accomplished by the novel compounds of the invention, characterized by the formula:

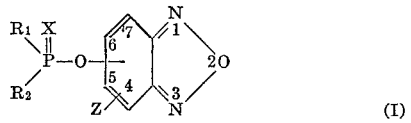

wherein $R_1$ and $R_2$ each individually represents alkoxy of 1 to 4 carbon atoms, X represents oxygen or sulfur, Z is hydrogen, alkyl of 1 to 4 carbon atoms, chlorine, bromine, or nitro.

Typical examples of the novel phosphorylated benzofurazans of the invention are mentioned in the working examples, hereafter, which demonstrate preparation and insecticidal testing of typical species of the compounds of the invention.

Preferred because of their toxicity to insects are those compounds of the above formula wherein $R_1$ and $R_2$ are alkoxy of 1 to 3 carbon atoms, X is either oxygen or sulfur, preferably sulfur, and Z is hydrogen, chlorine, or bromine, preferably chlorine.

The compounds of the invention may be prepared by reacting a compound of the formula:

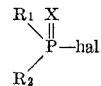

wherein $R_1$, $R_2$ and X have the meanings hereinbefore described, and hal represents a chlorine or bromine atom, with a compound having the formula:

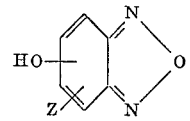

wherein Z is as hereinbefore described, in the presence of a base, preferably an alkali or alkaline earth metal carbonate, or a nitrogenous base, for example, pyridine, lutidine or, preferably, triethylamine.

The above reaction is preferably carried out in a liquid inert reaction medium which may be a solvent for the reactants or for the desired products or, preferably, for both. Aliphatic ketonic solvents such as acetone, methyl ethyl ketone and methyl isobutyl ketone are especially suitable for this purpose. Other suitable reaction media are, for example, benzene, diethyl ether, diisopropyl ether, tetrahydrofuran, chloroform, and carbon tetrachloride. The reactants and the base are preferably employed in substantially equimolar amounts. The reaction may be carried out at a temperature between 0 and 150° C., preferably between 50 and 100° C.

The reaction mixture obtained may be worked up in any conventional way. Thus, where the reaction has been effected in the presence of a water-miscible solvent such as acetone, the reaction mixture may be poured into water and the reaction product extracted with a suitable solvent, for example, ether, chloroform, methylene chloride, or benzene. Alternatively, the reaction mixture may be filtered to remove precipitated halide, the solvent may then be distilled off, and the residual product taken up in a water-immiscible solvent as mentioned above. The solution is then washed with water, and, if desired, with a dilute aqueous solution of an alkali, for example, sodium bicarbonate or sodium hydroxide, and again with water, dried and the solvent removed. In many cases the product obtained in this way is sufficiently pure. However, if desired, it may be purified, for instance, by recrystallization from a suitable solvent, such as cyclohexane or petroleum ether or by means of chromatography, for instance on a silica gel column.

The compounds of the invention have a high insecticidal activity against a variety of insects including related animal organisms belonging to the allied classes of arthropods, for example flies, mosquitoes, caterpillars, weevils, aphids, beetles, spiders and mites; they are broad spectrum insecticides. Several compounds of the invention have a relatively low mammalian toxicity.

Further, at least some of the compounds of the invention are effective in controlling insects that dwell in soil, at least one species having an extended residual activity for this purpose.

According to another aspect of the invention, pesticidal compositions comprise a compound of the general Formula I as active ingredient. The compositions may comprise in addition to the pesticide, a surface-active agent, or a carrier, or both a surface-active agent and a carrier.

The term "carrier" as used herein means a material, which may be inorganic or organic and synthetic or of natural origin, with which the active substance is mixed or formulated to facilitate its storage, transport, handling or its application to the plant, seed, soil or other object to be treated. The carrier may be a solid, a liquid or a compressed gas. Suitable solid carriers are, for example, silicates, synthetic hydrated silicon oxides, gypsum, diatomite, talc, pyrophyllite, clays of the montmorillonite or kaolinite groups, sulphur, carbon, resins such as polyvinyl chloride and styrene polymers and copolymers waxes, and solid fertilizers.

Examples of suitable liquid carriers are the well-known horicultural petroleum spray oils, and organic solvents, for example, alcohols such as methanol, ethanol and isopropanol, ketones such as acetone and methyl ethyl ketone, liquid hydrocarbons, chlorinated hydrocarbons, and polyalkylene glycol ethers and esters. Mixtures of different liquids are often suitable.

The surface-active agent may be, for example, a wetting agent, an emulsifying agent or a dispersing agent; it may be non-ionic or ionic. Examples of suitable surface-active agents are the condensation products of fatty acids containing at least 12 carbon atoms in the molecule with ethylene oxide or propylene oxide; partial esters of the said acids with glycerol, poly-glycerol, sorbitol or mannitol; sodium secondary alkyl sulphates; sodium salts of sulphonated castor oil, sodium alkyl aryl sulphonates such as sodium dodecyl benzene sulphonate; and condensation products of alkyl phenols with ethylene oxide or propylene oxide or their sulphated or sulphonated derivatives.

The compositions of the invention may be concentrates, suitable for storage or transport and containing, for example, from 10 to 98% by weight of a compound of the invention, or may be dilute compositions containing, for example, from 0.00001 to 10%, particularly from 0.01 to 0.5%, by weight of the active compound based on the total weight of the composition.

Thus the compositions may be formulated as wettable powders, dusts, granules, solutions, emulsifiable concentrates and emulsions.

The compositions of the invention may contain other ingredients, for example, other pesticides, stickers, or stabilizers.

The present invention also relates to a method of combating insects by bringing these insects into contact with one or more of the compounds or compositions specified above. Furthermore the invention relates to a process for improving crop yields by applying one or more of the compounds or compositions specified above to a crop area before or after crop planting, or before or after crop emergence.

The following samples are presented for purposes of illustration of the manner in which typical compounds of the invention are prepared and to demonstrate their insecticidal properties. The following examples should not be regarded in any manner as limiting the scope of the claimed invention.

The compounds 4-hydroxybenzofurazan, 5-hydroxybenzofurazan, 4-hydroxy-7-methylbenzolfurazan, 5-hydroxy-7-methylbenzofurazan, 4-bromo-5-hydroxybenzofurazan, 4-chloro-5-hydroxybenzofurazan, and 4-nitro-5-hydroxybenzofurazan which are starting materials for the preparation of the phosphorylated compounds, may be prepared as follows:

(A) 4-hydroxybenzofurazan

To 5 g. of 4-methoxybenzofurazan were added 100 ml. of 48% HBr; the mixture was refluxed for 15 minutes and then cooled. The 4-hydroxybenzofurazan precipitated from the solution and was isolated by filtration. By recrystallization from n-heptane white needles of the desired compound having a melting point of 148–150° C. were obtained in a yield of 80%.

*Analysis.*—Calcd. for $C_6H_4N_2O_2$ (percent): C, 52.9; H, 3.0; N, 20.6. Found (percent): C, 52.8; H, 2.9; N, 20.5.

(B) 5-hydroxybenzofurazan

To 10 g. of 5-methoxybenzofurazan were added 100 ml. of 48% HBr and the mixture was refluxed for 15 minutes to give a clear solution of the desired demethylated product. After cooling the solution was extracted with methylene chloride, the extract obtained washed with water, and by distilling off the solvent a crude material having a melting point of 102–103° C. was left. By recrystallizing twice from chloroform clusters of yellow needles having a melting point of 106–107° C. were obtained. Yield 80%.

*Analysis.*—Calcd. for $C_6H_4N_2O_2$ (percent): C, 52.9; H, 3.0; N, 20.6. Found (percent): C, 52.8; H, 2.9; N, 20.5.

(C) 5-hydroxy-7-methylbenzofurazan 4.36 g. of 2-nitro-4-methoxy-6-methylaniline were dissolved in a mixture of 35 ml. of acetic acid and 17.6 ml. of sulphuric acid. The resulting solution was cooled to 0° C. and 1.96 g. of sodium nitrile dissolved in a minimum quantity of water were slowly added. After stirring for 15 minutes at 0° C. 3.52 g. of sodium azide in 10 ml. of water were slowly added. The reaction mixture was then diluted with water to precipitate the azido compound. The yellow solid precipitate was collected, washed with water and then dissolved in 30 ml. of xylene and refluxed until no more nitrogen was evolved. The resulting solution was heated with charcoal and then concentrated to give a crude product which after recrystallization from ethanol gave 5-methoxy-7-methylbenzofurazan oxide having a melting point of 105–106° C. in a yield of 75%.

5-methoxy-7-methylbenzofurazan oxide was deoxygenated by refluxing 1.80 g. of this compound in 100 ml. of xylene with 2.88 g. of triphenylphosphine for 2 hours. The reaction mixture was evaporated to dryness under reduced pressure and the residual 5-methoxy-7-methylbenzofurazan was converted into 5-hydroxy-7-methylbenzofurazan by using the method described under B. The resulting compound having a melting point of 166–168° C. was obtained as colorless needles in a yield of 85% based on 5-methoxy-7-methylbenzofurazan oxide.

*Analysis.*—Calcd. for $C_7H_6N_2O_2$ (percent): C, 56.0; H, 4.0. Found (percent): C, 55.7; H, 4.1.

(D) 4-hydroxy-7-methylbenzofurazan

This compound was prepared in an analogous manner as 5-hydroxy-7-methylbenzofurazan. The product was obtained as colorless needles melting at 113° C. in a yield of 80% based on 4-methoxy-7-methylbenzofurazan oxide.

(E) 4-chloro-5-hydroxybenzofurazan 6.6 g. (0.044 mol) of 5-methoxybenzofurazan were dissolved in 100 ml. of carbon tetrachloride and at a temperature below 25° C. chlorine was introduced into the solution until a weight increase of 3.15 g. (0.088 mol of chlorine) was obtained. The solution was allowed to stand overnight and the crystallized product was filtered off. By recrystallization from carbon tetrachloride 4-chloro-5-methoxybenzofurazan having a melting point of 131° C. was obtained in a yield of 60%.

*Analysis.*—Calcd. for $C_7H_5ClN_2O_2$ (percent): C, 45.5; H, 2.7; Cl, 19.3. Found (percent): C, 45.0; H, 2.7; Cl, 19.6.

4-chloro-5-methoxybenzofurazan was demethylated by means of the method described under B. Melting point 192.5° C., yield 70%.

*Analysis.*—Calcd. for $C_6H_3ClN_2O_2$ (percent): C, 42.2; H, 1.8; Cl, 20.8. Found (percent): C, 41.8; H, 2.1; Cl, 20.8.

(F) 4-bromo-5-hydroxybenzofurazan 9.2 g. (0.05 mole) of 5-methoxybenzofurazan were dissolved in 100 ml. of carbon tetrachloride, 8 g. (0.1 mole) of bromine were added and the solution refluxed for 2 hours. On cooling 4-bromo-5-methoxybenzofurazan crystallized from the solution. It was filtered off and recrystallized from a mixture of benzene and petroleum ether. Melting point 150–151° C.: yield 50%.

*Analysis.*—Calcd. for $C_7H_5BrN_2O_2$ (percent): C, 36.9; H, 2.2; Br, 35.0. Found (percent): C, 37.3; H, 2.4; Br, 34.9.

4-bromo-5-methoxybenzofurazan was demethylated by means of the method described under B. The crude product was recrystallized from benzene. Melting point 189° C.

*Analysis.*—Calcd. for $C_6H_3BrN_2O_2$ (percent): C, 33.6; H, 1.4; Br, 37.1. Found (percent): C, 33.7; H, 1.4; Br, 37.0.

(G) 4-nitro-5-hydroxybenzofurazan 12.5 g. of 5-methoxybenzofurazan were dissolved in 100 ml. of concentrated sulphuric acid at a temperature of −10° C. and 3.7 ml. of fuming nitric acid were added over a period of ten minutes. The mixture was stirred at −15° C. for 15 minutes, then poured onto ice and the crude precipitated product filtered off. By recrystallization from ethanol 4-nitro-5-methoxybenzofurazan was obtained in 80% yield. Melting point 117–118° C.

*Analysis.*—Calcd. for $C_7H_5N_3O_4$ (percent): C, 43.1; H, 2.6; N, 21.5. Found (percent): C, 43.2; H, 2.8; N, 20.7.

4-nitro-5-hydroxybenzofurazan was obtained by demethylating 4-nitro-5-methoxybenzofurazan by means of the method described under B, but with the exception that the methoxy compound was refluxed with HBr for 90 minutes instead of 15 minutes. Yield 81%, melting point after recrystallization from chloroform 142° C.

*Analysis.*—Calcd. for $C_6H_3N_3O_4$ (percent): C, 39.8; H, 1.7; N, 23.2. Found (percent): C, 39.8; H, 1.8; N, 22.6.

(H) 4-chlorobenzofurazan 4-chlorozenzofurazan oxide was deoxygenated by means of triphenyl phosphine using the method described under C. The product was purified by sublimation at 110–120° C. at 0.5 mm. Hg pressure. Yield 75%; melting point 85° C.

EXAMPLE I

Preparation of 5-diethoxyphosphinyloxybenzofurazan

A mixture of 2.72 g. of 5-hydroxybenzofurazan (0.002 mole), 2.76 g. of anhydrous potassium carbonate (0.002 mole) and 1.35 g. of diethyl phosphorchloridate (0.002 mole) in 100 ml. of acetone was stirred and refluxed for 2 hours. After filtration the solvent was removed in vacuo and the residue dissolved in methylene chloride. The solution was washed with ice-cold water and then dried over sodium sulphate. By distilling off the methylene chloride in vacuo an amber oil was obtained which was purified by chromatography on a silica gel column. Yield 95%.

*Analysis.*—Calcd. for $C_{10}H_{13}N_2O_5P$ (percent): C, 44.2; H, 4.8; N, 10.3; P, 11.4. Found (percent): C, 44.2; H, 5.1; N, 9.6; P, 11.4.

EXAMPLE II

By employing the same method as described in Example I a number of phosphorylated benzofurazans according to the invention were prepared. In all experiments the appropriate 4- or 5-hydroxybenzofurazan was refluxed in acetone for 2 hours with an equimolar amount of the appropriate dialkyl phosphorochloridate or dialkyl phosphorochloridothionate in the presence of an aquimolar amount of anhydrous potassium carbonate. In most cases a sufficiently pure product was left after distilling off the methylene chloride; in one case the crude product was crystallized from petroleum ether. The experiments are summarized in Table I.

TABLE I

| Compound | Reactants | | Yield, percent | Melting point, °C. | Analysis, percent |
|---|---|---|---|---|---|
| 5-diethoxyphosphinyloxy-7-methyl benzofurazan. | Diethyl phosphorochloridate. | 5-hydroxy-7-methyl-benzofurazan. | 97 | Oil | Found: C, 46.2; H, 5.5; P, 10.6; calcd. for $C_{11}H_{15}N_2O_5P$: C, 46.2; H, 5.5; P, 10.8. |
| 4-diethoxyphosphinyloxybenzofurazan. | Diethyl phosphorochloridate. | 4-hydroxy-benzofurzan. | 95 | Oil | Found: C, 44.3; H, 4.8; N, 10.2; P, 11.4; calcd. for $C_{10}H_{13}N_2O_5P$: C, 44.0; H, 4.8, N, 10.3; P, 11.0. |
| 5-dimethoxyphosphinothiolyloxy-benzofurazan. | Dimethyl phosphorochloridothionate. | 5-hydroxy-benzofurazan. | 90 | ¹ 47.5–49.0 | Found: C, 36.5; H, 3.8; S, 11.9; P, 11.8; calcd. for $C_8H_9N_2O_4PS$: C, 36.9; H, 5.5; S, 12.5; P 11.9. |
| 4-bromo-5-dimethoxyphosphinothioyloxybenzafurazan. | Dimethyl phosphorochloridothionate. | 4-bromo-5-hydroxy-benzofurazan. | 95 | Oil | Found: C, 29.2; H, 2.7; P, 9.5; Br, 21.9; calcd. for $C_8H_8BrN_2O_4PS$: C, 28.4; H, 2.4; P, 9.2; Br, 23.6. |
| 4-chloro-5-dimethoxyphosphinothioyloxybenzofurazan. | Dimethylphosphorochloridothionate. | 4-chloro-5-hydroxy-benzofurazan. | 94 | Oil | Found: C, 33.6; H, 3.0; P, 9.5; Cl, 12.1; calcd. for $C_8H_8ClN_2O_4PS$: C, 32.6; H, 2.7; P, 10.6; Cl 12.1. |
| 5-dimethoxyphosphinothioyloxy-7-methyl-benzofurazan. | Dimethyl phosphorochloridothionate. | 5-hydroxy-7-methyl-benzofurazan. | 95 | Oil | Found: C, 39.0; H, 3.9; S, 11.7; P, 11.4; calcd. for $C_9H_{11}N_2O_4PS$: C, 39.4; H, 4.0; S, 11.7; P, 11.3. |
| 4-dimethoxyphosphinothioyloxy-7-methylbenzofurazan. | Dimethyl phosphorochloridothionate. | 4-hydroxy-7-methyl-benzofurazan. | 90 | Oil | Found: C, 39.3; H, 3.9; calcd. for $C_9H_{11}N_2O_4PS$: C, 39.4; H, 4.0. |
| 4-dimethoxyphosphinothioyloxy-benzofurazan. | Dimethyl phosphorochloridothionate. | 4-hydroxy-benzofurazan. | 90 | Oil | Found: C, 36.9; H, 3.8; S, 12.7; P, 11.7; calcd. for $C_8H_9N_2O_4PS$: C, 36.9; H, 3.5; S, 12.3; P, 11.9. |
| 4-dimethoxyphosphinothioyloxy-7-chlorobenzofurazan. | Dimethyl phosphorochloridothionate. | 4-hydroxy-7-chloro-benzofurazan. | 95 | Oil | Found: C, 32.6; H, 3.0; Cl, 11.1; P, 10.4; calcd. for $C_8H_8N_2SO_4PCl$: C, 32.7; H, 2.7; Cl, 11.1; P, 10.6. |
| 4-diethoxyphosphinothioyloxy-7-chlorobenzofurazan. | Diethyl phosphorochloridothionate. | 4-hydroxy-7-chloro-benzofurazan. | 95 | Oil | Found: C, 37.4; H, 3.8; Cl, 11.3; P, 9.6; calcd. for $C_{10}H_{12}N_2SO_4PCl$: C, 37.2; H, 3.7; Cl, 11.0; P, 9.6. |
| 4-methoxyethoxyphosphinothioyloxy-7-chlorobenzofurazan. | Methyl ethyl phosphorochloridothionate. | 4-hydroxy-7-chloro-benzofurazan. | ——— | Oil | Found: C, 35.0; H, 3.4; P, 9.9; calcd. for $C_9H_{10}N_2SO_4PCl$: C, 35.0; H, 3.3; P, 10.0. |
| 4-methoxyisopropoxyphosphinothioyloxy-7-chlorobenzofurazan. | Methyl isopropyl phosphorochloridothionate. | 4-hydroxy-7-chloro-benzofurazan. | ——— | 48–49 | Found: C, 37.0; H, 3.7; Cl, 10.9; P, 9.6; calcd. for $C_{10}H_{12}N_2SO_4PCl$: C, 37.2; H, 3.7; Cl, 11.0; P, 9.6. |

¹ After recrystallization from petroleum ether.

EXAMPLE III

The insecticidal activity of the compounds obtained in the previous examples was tested as follows:

(I) A 0.1% by weight solution in acetone of the compound to be tested was prepared, and taken up in a micrometer syringe. Two to three day-old adult female house flies (*Musca domestica*) were anaesthetized with carbon dioxide, and a 1 microliter drop of the test solution was applied on the ventral abdomen of each, 20 flies being treated. The treated flies were held for 24 hours in glass jars, each containing a little granulated sugar as food for the flies, and the percentage of dead and moribund individual was then recorded.

(II) A quantity of 0.1 mm. of a 0.1% by weight solution of the compound to be tested in acetone was mixed in a beaker with 100 ml. of water. Twenty 5–6 day-old (4th instar) mosquito larvae (*Aedes aegypti*) were added and the beakers stored for 24 hours. The percentage of dead and moribund larvae was then recorded.

(III) The compounds were formulated as solutions or suspensions in water containing 20% by weight of acetone and 0.05% by weight of a wetting agent. The formulations contained 0.2% by weight of the compound to be tested. Turnip and broad bean plants, trimmed to one leaf each, were sprayed on the under surface of the leaf with the above formulation. Spraying was effected with a spraying machine delivering 40 gallons per acre, the plants passing under the spray on a moving belt. The 4th instar (8-day-old) diamond-back moth larvae (*Plutella maculipennis*), ten apterous (6-day-old) pea aphids (*Acyrthosiphon pisum*), and ten adult 1–2 week-old mustard beetles (*Phaedon cochleariae*) respectively were placed on the sprayed leaves and each plant then enclosed in a glass cylinder fitted at one end with a muslin cap. Mortality counts were made after 24 hours. In tests against glass house red spider mites (*Tetranychus telarius*) leaf discs cut from French bean plants were sprayed in the manner described under III. One hour after spraying, the discs were inoculated with 10 adult mites. Mortality counts were made 24 hours after inoculation.

The results of the above tests were summarized in the following Table II, where A denotes 100% kill, B some kill and C no kill of the test insects.

and provide a concentration of 3.3 parts by weight of the test material per million parts by weight of the soil. The soil then was dried to remove the acetone, moistened with water and divided into jars. The jars were sealed and held at 72° F. One day after the soil had been placed in the jars, certain of the jars were opened and third instar larvae of the western spotted cucumber beetle (*Diabrotica undecimpunctata undecimpunctata*) were introduced into the soil. The jars were sealed, held for 24 hours, then the mortality of the larvae was determined. This procedure was repeated at intervals of 1, 2, 4 and 8 weeks after introduction of the treated soil into the jars.

The results are summarized in Table III.

TABLE III

| Compound | Percent mortality, at indicated weeks after treatment | | | | |
|---|---|---|---|---|---|
| | 0 | 1 | 2 | 4 | 8 |
| 4-diethoxyphosphinothioyl-oxy-7-chlorobenzofurazan | 100 | | 100 | 100 | 100 |
| 4-methoxyethoxyphosphino-thioyloxy-7-chlorobenzo-furazan | 100 | 100 | 75 | 100 | 0 |
| 4-methoxyisopropoxyphosphino-thioyloxy-7-chlorobenzo-furazan | 100 | | 100 | 90 | (¹) |

¹ Test not complete at time data reported.

We claim as our invention:

1. A compound of the formula:

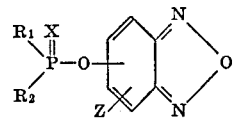

wherein $R_1$ and $R_2$ each individually is alkoxy of 1 to 4 carbon atoms, X is oxygen or sulfur, Z is hydrogen, alkyl of 1 to 4 carbon atoms, chlorine, bromine, or nitro.

TABLE II

| Compound | *Musca domestica* | *Aedes aegypti* (larvae) | *Phaedon cochleariae* | *Plutella maculipennis* (larvae) | *Acyrthosiphon pisum* | *Tetranychus telarius* |
|---|---|---|---|---|---|---|
| 5-diethoxyphosphinyloxy-benzofurazan | A | A | A | A | A | A |
| 5-diethoxyphosphinyloxy-7-methyl-benzofurazan | A | B | A | B | A | A |
| 4-diethoxyphosphinyloxy-benzofurazan | A | A | A | A | A | A |
| 5-dimethoxyphosphino-thioyloxy-benzofurazan | A | A | A | A | A | A |
| 4-bromo-5-dimethoxyphosphino-thioyloxybenzofurazan | A | A | B | A | B | A |
| 4-chloro-5-dimethoxy-phosphino-thioyloxybenzo-furazan | A | A | A | A | A | A |
| 5-dimethoxyphosphinothioyloxy-7-methylbenzofurazan | A | A | A | B | A | A |
| 4-dimethoxyphosphinothioyloxy-7-methylbenzofurazan | A | A | A | B | A | B |
| 4-dimethoxyphosphinothioyloxy-benzofurazan | A | A | A | A | A | A |
| 5-dimethylphosphinothioyloxy-benzofurazan | A | C | A | A | A | A |
| 5-diethylphosphinothioyl-oxybenzofurazan | A | C | A | A | A | A |
| 4-diethoxyphosphinothioyl-thio-5(7)-nitrobenzo-furazan oxide | A | C | A | A | A | A |
| 4-dimethoxyphosphinothioylthio-5(7)-nitrobenzo-furazan oxide | C | C | C | A | A | A |
| 4-diethoxyphosphinothioyl-thio-5(7)-nitrobenzo-furazan | C | C | A | B | A | A |
| 4-dimethoxyphosphinothioylthio-5(7)-nitrobenzo-furazan | C | C | C | C | B | A |
| 4-dimethoxyphosphinothioyloxy-7-chlorobenzofurazan | A | A | A | A | A | A |
| 4-diethoxyphosphinothioyloxy-7-chlorobenzofurazan | A | A | A | A | A | A |
| 4-methoxyethoxyphosphino-thioyl-oxy-7-chlorobenzo-furazan | A | A | A | A | A | A |
| 4-methoxyisopropoxyphosphino-thioyloxy-7-chlorobenzo-furazan | A | A | A | A | A | A |

EXAMPLE IV

Some of the compounds of the invention have shown effectiveness for controlling soil-dwelling insects, as follows:

An acetone solution of the test compound was sprayed onto soil, as the soil was being tumbled in a mixer, so as to uniformly disseminate the test compound into the soil 2. A compound according to claim 1 wherein $R_1$ and $R_2$ are alkoxy of 1 to 3 carbon atoms, X is sulfur and Z is chlorine.

3. A compound according to claim 1 wherein $R_1$ and $R_2$ each is ethoxy, X is sulfur, Z is chlorine attached to the carbon atom in the 7-position and the oxygen atom bonded to phosphorus is bonded to the carbon atom at the 4-position.

4. A compound according to claim 1 wherein $R_1$ is methoxy, $R_2$ is isopropoxy, X is sulfur, Z is chlorine attached to the carbon atom in the 7-position and the oxygen atom bonded to phosphorus is bonded to the carbon atom at the 4-position.

References Cited

UNITED STATES PATENTS 3,029,248  4/1962  Hoffman et al. _____ 260—304
3,232,951  2/1966  Lorenz _____ 260—307

OTHER REFERENCES

Morton, The Chemistry of Heterocyclic Compounds, (New York, 1946), pp. 363 and 384.

ALTON D. ROLLINS, Primary Examiner

U.S. Cl. X.R.

424—200